United States Patent [19]
Stedtnitz

[11] 3,812,481
[45] May 21, 1974

[54] NON-CONTACTING ELECTRICAL ROTARY POSITION AND ROTATION TRANSDUCER

[75] Inventor: Wolfgang Stedtnitz, Neukrug, Germany

[73] Assignee: Robert Bosch GmbH, Gerlingen-Schillerhohe, Germany

[22] Filed: Nov. 27, 1972

[21] Appl. No.: 310,221

[30] Foreign Application Priority Data
Nov. 26, 1971 Germany............................ 2158713

[52] U.S. Cl.................................. 340/196, 336/79
[51] Int. Cl............................................ G08c 19/06
[58] Field of Search ............ 340/196, 199; 318/660; 336/75, 79, 123

[56] References Cited
UNITED STATES PATENTS

| | | | |
|---|---|---|---|
| 3,611,813 | 10/1971 | Brocker.............................. | 340/196 |
| 3,231,839 | 1/1966 | Koning................................. | 336/79 |
| 3,471,844 | 10/1969 | Schugt................................ | 340/196 |
| 2,900,612 | 8/1959 | Tripp.................................. | 340/196 |
| 2,495,741 | 1/1950 | Labin et al........................... | 336/79 |
| 2,867,783 | 1/1959 | Childs................................ | 340/196 |

*Primary Examiner*—Thomas B. Habecker
*Attorney, Agent, or Firm*—Flynn & Frishauf

[57] ABSTRACT

A rotor, in form of a disk, has a stator opposed thereto, similar to a pancake-type dynamo electric machine; the stator has applied thereto an energizing winding, in form of a spiral surrounding the imaginary rotor axis; the rotor has undulating conductor strips, for example printed circuit strips in form of a winding applied to the end face, inductively coupled to the energizing winding. The rotor winding is short-circuited. Opposite the rotor winding, and of similar shape and outline of the undulating winding is an output winding on the stator, the stator output winding being connected over rectifiers and differential amplifiers to a logic network. Upon position coincidence of the short-circuited winding (energized by a-c from the energizing winding) with the output winding, output voltages will appear at the winding representative of relative position between the short-circuited winding and the output winding, and hence between the rotor and stator disks.

19 Claims, 5 Drawing Figures

NON-CONTACTING ELECTRICAL ROTARY POSITION AND ROTATION TRANSDUCER

The present invention relates to an electrical position-rotation transducer which is so constructed that there are no physical contact connections to the rotor, and more particularly to a position, or rotation transducer which is highly accurate and which permits ready analysis of respective positions to an accuracy of one degree, and less, and which, in one form, can provide a digital output which can be decoded to indicate magnitude of position change, direction of position change, and, when measured against a time base, speed.

Various electronic devices have been proposed to measure angular displacement, or rotational movement, usually referred to as angular position transducers. Such transducers preferably should provide fine resolution of angular displacement, and additionally should not provide any substantial loading or counter torque introduced by the device itself. Thus, low friction is highly desired, so that exact measurements can be carried out even if the forces tending to change angular displacement are very small. Accurate response of the transducer, without lag, delay, or damping due to friction or other effects is desired. Such transducers are also used in order to provide pulses proportional to rotational speed, that is, to provide tachometer-type output pulses which provide, for each revolution, one or only a few pulses which are, however, exactly defined and reproducible, and depend precisely on the rotational movement. It is usually only possible to use contact-less devices if low friction and torque are desired.

Inductive transducers have been proposed which operate on the principles of the so-called inductosyn system. Such systems have been proposed for numerical machine tool control, see, for example, "Die numerische Steuerung von Werkzeugmaschinen," by Prof. Dr. Ing. Wilhelm Simon, 1971, published by Carl Hanser Verlag, Munich, pp. 112 et seq. — "Numerical Control of Machine Tools." In the inductosyn system, a stator and a rotor are provided, stator and rotor having undulating conductors placed thereon, following a complete circle. The conductors of the rotor are supplied with alternating current; induced, amplitude modulating voltages can then be derived from the stator.

Systems of this type operate satisfactorily but have the substantial disadvantage that they require contacts, or slip rings in order to supply alternating current to the rotor conductors. Such slip rings introduce friction which is not tolerable for high accuracy inductive transducers.

It is an object of the present invention to provide an inductive transducer system which permits very fine resolution of angular displacements, has a high accuracy, low friction, and a low rotating mass.

SUBJECT MATTER OF THE PRESENT INVENTION

Briefly, the rotor has one winding thereon, similar to the "inductosyn" winding, that is, an undulating, or crenelated outline. This winding is short-circuited. The winding is energized by an energizing winding placed on the stator which, in one form, is a spiral, inductively coupled with the crenelated, or undulating short-circuited rotor winding. The stator has an additional winding thereon which matches the outline and configuration of the short-circuited winding, from which output winding amplitude modulated energy can be derived, fed back thereto by the currents flowing in the short-circuited winding on the rotor, and induced therein initally by the energizing winding on the stator.

Supply of the winding on the rotor is thus by inductive coupling, and contact-less; the currents flowing in the short-circuited winding will have negligible armature reaction effects with respect to the stator, due to the coupling with the stator. Drag torque due to friction effects resulting from other power supplies, for example over slip rings, or the like, is completely eliminated.

The shape or configuration of the short-circuited winding and the output winding is preferably so selected that it is either in the form of a square wave pulse curve, that is, crenelated, or it may have other shapes, for example one of undulations representative of a curve of continuously varying repetition rate. The curve on the stator is so arranged that outputs are derived therefrom by correlation techniques, preferably cross-correlation, providing defined sharp output pulses when there is congruence between the short-circuited rotor and the stator output winding. The rotor winding may be offset with respect to the stator winding by a predetermined amount to obtain digital output signals upon relative change of rotor and stator position, which can be applied to a decoding network, as well known in the art, and derive therefrom digital outputs representative of displacement, direction of displacement, and a count of total displacement, that is, revolutions.

The energizing winding preferably is a loop, for example a spiral, concentric about the axis of the rotor. It may, directly, form a tank coil of an oscillator, forming the power supply for the short-circuited winding.

The configuration of the short-circuited winding and of the output winding, that is their form, or shape function, can be selected in dependence on the intended use of the transducer. Thus, the configuration may be in the representation of a periodic oscillation, of square-wave undulations (permitting high angular resolution) with concentrically arranged periodic oscillations of different frequencies, for example in accordance with a binary system or the like, to provide a counting-type output. The undulations may be periodic, or aperiodic. If, for each revolution of the rotor, only a few pulses are desired, for example only a single but precisely defined pulse occurring at a precise angular position of rotor with respect to stator, and having steep flanks, then the form function, in accordance with an embodiment of the invention, which is selected as preferably a stochastic, or pseudostochastic function, and the specific selected function on the rotor and on the stator should be identical. If more than one pulse is desired, for each revolution of the system, then one of the elements (rotor or stator) may have a sequence of functions of this character applied thereto, the other having a lesser number or only one. This arrangement permits precise, noise-free direct determination of revolutions of the short circuit system with respect to a fixed stator position.

In a preferred form, the windings or conductors are placed on flat disks, similar to the arrangement of a pancake-type dynamo electric machine. By placing a number of windings, concentrically, around the axis with different recurrence rates of undulations, differently scaled outputs, such as revolutions per second, minute, or the like, may be obtained.

The inductive transducer thus operates with low inertia, low torque, and is not subject to wear, or will introduce friction. A wide range of resolution of angular displacement is possible, permitting measurement of smallest incremental angular changes, as well as of exact measurement of rotation at extremely high speed to provide output pulses accurately reflecting the position of the rotor with respect to the stator and occcuring only at a specific angular relative position of rotor and stator, independent of speed.

The invention will be described by way of example with reference to the accompanying drawings, wherein.

Figure 1:
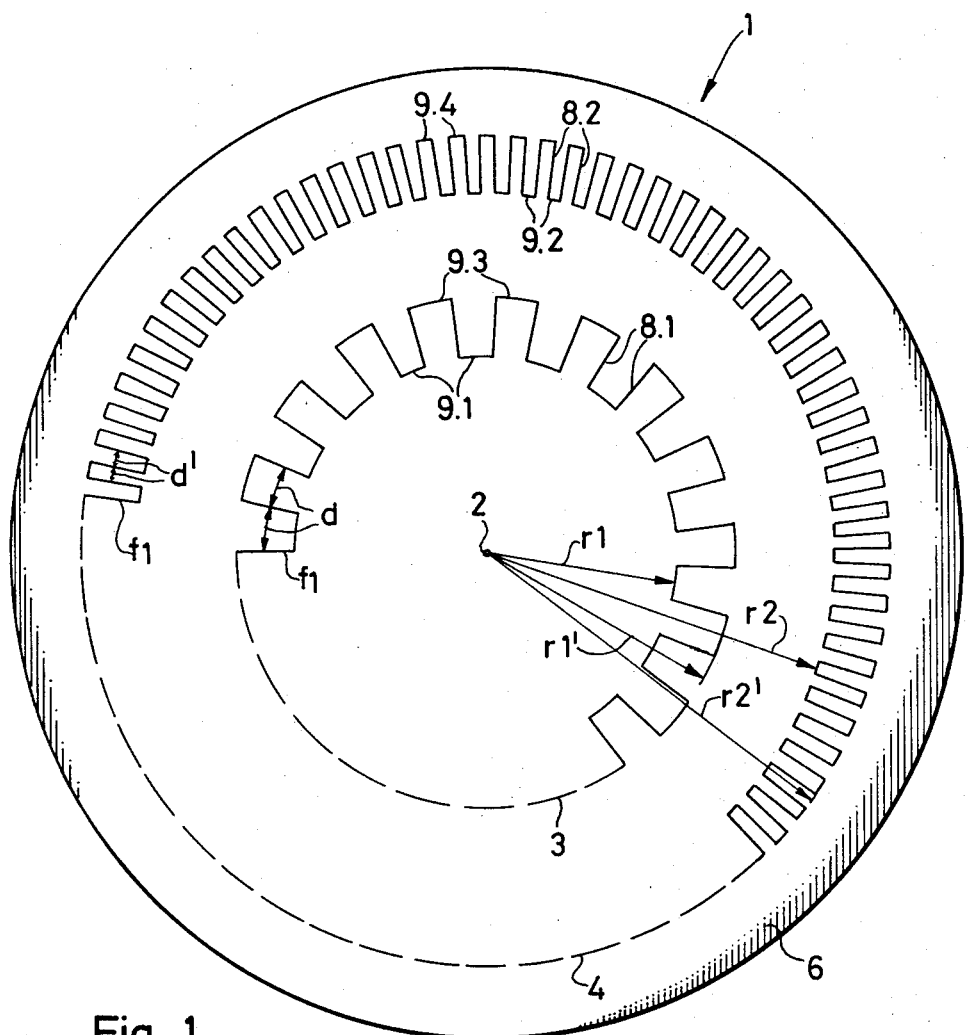
FIG. 1 is a plan view of the end face of a rotor element including a short circuit winding thereon.

The rotor 1 (FIG. 5) is a flat disk of a carrier plate 6 mounted on a shaft 25 to rotate about a central axis 2. Shaft 25 is carried by or connected to the rotary system, the position, or rotation of which is to be transduced.

Located opposite the rotor 1, and spaced by a small air gap is a stator 10. The faces of rotor 1 and stator 10 having windings formed thereon, for example in accordance with printed circuit techniques, shown in highly exaggerated form in FIG. 5. The carrier 26 of stator 10 and the carrier 6 of rotor 1 are separated by a distance E, which may, in case of a printed circuit, be the effective distance of separation of the windings on the rotor 1 and the stator 10.

The winding on rotor 1 is illustrated in FIG. 1. It is formed of two short circuited conductive paths 3, 4, which undulate in the form of periodic oscillations about the center axis 2. The periodic oscillations form a function $f1$ which has a plurality of radially extending elements 8.1, 8.2, located in respectively different radial positions; the radially extending conductive paths 8.1 extend from an inner radius $r1$ to an outer $r1'$; the radially extending conductive path 8.2 extends from an inner radius $r2$ to an outer radius $r2'$. The radially extending conductors, forming conductive paths, and made for example by printed circuit techniques, are alternately connected to adjacent conductor elements at the inner radii and outer radii, respectively, by circumferntially extending sector elements 9.1, 9.3, respectively, for the inner radially extending elements 8.1, and 9.2, 9.4, respectively, for the outer radially extending elements 8.2. The conductive path, that is, the short circuit winding 4, has a fine angular sub-division with a much higher repetition rate than the winding 3.

Figure 2:
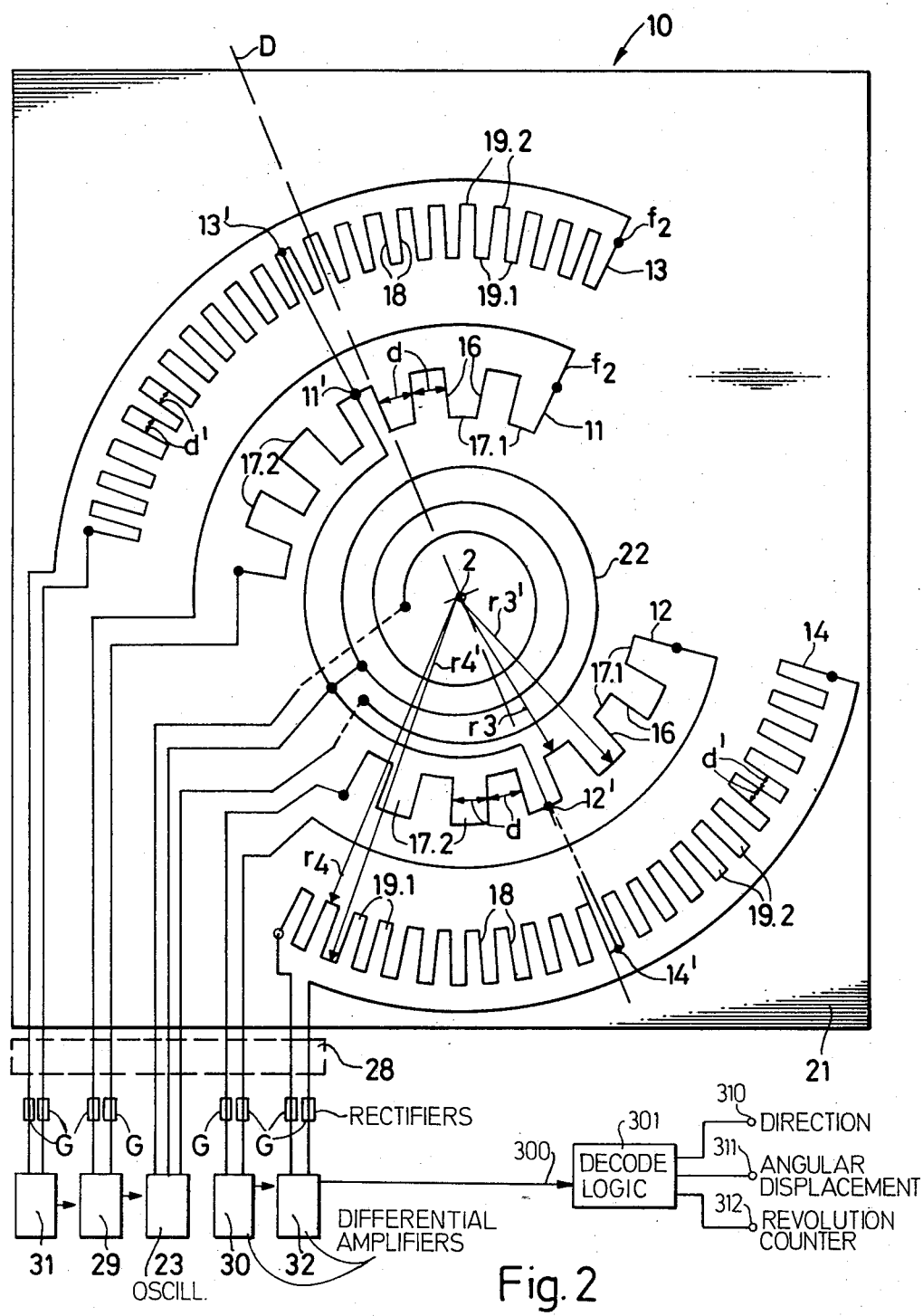
FIG. 2 is a plan view of the stator element illustrating the energizing winding and the output winding thereon.

The stator windings are shown, in end view, in FIG. 2. The output portions of the stator windings include four conductive paths, or windings 11, 12, 13, 14, the windings 11, 12 being concentrically located about the axis 2 and about a common inner radius, whereas the outer windings 13, 14 are located along an outer common radius.

The windings 11, 12 have a configuration which is in accordance with a form function $f2$, as seen in FIG. 2, and have undulating or crenelated form, similar to the shape of winding 3. The conductors of windings 11, 12 thus have radial portions 16, spaced from each other by angular distances $d$, and interconnected by circumferentially extending sector elements 17.1, 17.2 at the inner and outer radii $r3$, $r3'$, respectively, to match the configuration, or outline of conductor 3 of the rotor 1 (FIG. 1).

The windings 13, 14 have conductors which exhibit a configuration of function of their shape $f2$, in square wave, undulating, or crenelated configuration. Radially extending conductive paths 18 are separated from each other by circumferential distances $d'$, and interconnected, alternately, at the inner and outer radii $r4$, $r4'$ by connecting sector elements 19.1, 19.2, respectively, to match the configuration of the outer winding 4 of the rotor 1.

The number of undulations of the conductors 11, 12, 13, 14 is freely selectable. Preferably, it is so selected that is can be readily manufactured or fitted within the space available on the rotor disk, and to provide for a good and tight coupling between the conductors 11, 12, 13, 14 of the stator 10 and conductors 3, 4, of the short circuit system 1. In the example selected, the undulations of the stator and rotor shown in FIGS. 1 and 2 have identical frequency, or alternate change of radii. In this system, the limit of undulations is determined by the shape and size of the stator. The conductors 11, 12 and 13, 14, that is, the sector-conductors on the stator are non-symmetrically located with respect to each other, although they are placed on concentric diameters. They are offset with respect to each other by quarter of an angular oscillation, or undulation $d$, $d'$, respectively, as can clearly be seen in FIG. 2 by comparing the position of the diameter line D with that of the outline of the configuration.

The stator carrier 21 of stator 10 carries on additional winding, that is, the energization winding 22. Winding 22 is in form of a loop, and preferably in form of a spiral loop which may directly form the tank coil of an oscillator 23 connected thereto. Tank coil or conductor 22 is inductively coupled with the rotor conductors 3, 4, of the short circuit system on rotor 1 and induces a high frequency short circuit current within the conductors 3, 4. The frequency of the oscillator 23 is not critical and may be selected in accordance with design considerations. A range of from between 1–10 MHz is suitable considering the physical characteristics and outline of suitable conductors 22, in view of their inductivity. Oscillator 23 can be any suitable and well known oscillator which requires few parts, for example a tapped feedback winding-type oscillator. The inductive coupling between tank winding 22 to the windings 3, 4 of the short circuit system is aperiodic. Resonance phenomena in this coupling system are not utilized, and frequency stability of oscillator 23 is not necessary, since the oscillations, or the output from oscillator 23 are not utilized, but rather the amplitude variations of the induced output, induced into windings 11, 13, 12, 14, respectively, due to the short circuit current flowing in windings 3, 4.

Upon angular displacement of the rotor 1, output windings 11, 13, 12, 14 will provide amplitude and phase modulated voltages. The frequency of the modulated voltage will depend on the number of the undulations, or crenelations 3, 4, of the short circuit system on the rotor, and on the rotary displacement of the rotor with respect to the stator. The amplitude modulated output voltages are transformed, in accordance with known circuit techniques, into square wave pulses, which can then be utilized for application to a counter, or to other utilization circuits.

The voltages derived from the stator can be rectified directly and without subsequent amplification if the stator windings 11, 12, 13, 14, approximately midway along their overall length are galvanically coupled with the oscillator or energizing winding 22, at coupling or connecting points 11', 12', 13', 14'. The windings 11, 12, 13, 14 thus are supplied from the connecting points 11', 12', 13', 14' with symmetrically oppositely phased voltages, having a modulation level which is above the threshold of the rectifiers. By inductive coupling with the rotor windings, each winding 11, 12, 13, 14 of the stator will then have currents induced therein which, essentially, include an integrating portion which is a periodic cross correlation function of the relative rotation of the short circuit winding system 3, 4, on rotor 1, with respect to the stator 10. In the embodiment of FIG. 2, where the waves are square waves, the cross correlation function is a triangular function.

Terminal ends of windings 11, 12, 13, 14 are connected through rectifiers schematically shown as G to differential amplifiers 29, 30, 31, 32 which provide square wave pulses if they are driven into saturation. The rectifiers are shown only schematically, since they may, physically, be full-wave, half-wave or other rectifier systems. The output from the differential amplifiers 32 are, as schematically indicated by the arrows, connected to a cable 300 which connects to a decode logic 301. The output from decode logic 301 is then available at a direction indicator 310, at an angular displacement indicator 311, and at a revolution counter 312. Analysis and decoding of the output from the differential amplifiers in the decoding logic 301 is well known in the digital decoding art.

The phase shifted arrangement of the conductors 11, 12, respectively, and 13, 14, respectively, provide for resolution of an angular displacement into sine and cosine functions. The phase position of the voltages is an indication of direction of rotation, and pulse counting, that is revolution counting can readily be decoded by decode logic 301 in accordance with known counting techniques. The output from direction indicator 310, displacement indicator 311, and revolution counter 312 may be used as control parameters for measuring and control systems, as desired. The further utilization of the signals at the indicators will depend on the final utilization of the apparatus. The specific decode logic, and the specific types of output signals need not be referred to in detail since the output will be similar to that derived from many other position transducer systems operating on the contacting-type principle.

The arrangement of the windings on the rotor and stator provides, upon a full revolution of the rotor with respect to the stator, a sequence of 90 pulses from the conductors 13, 14, and a sequence of 36 pulses from the conductors 11, 12. The arrangement can readily be made in such a manner that, for each revolution of the rotor, 720 pulses are derived, corresponding to one-half degree. Transducers of only limited diameter can readily be constructed by means of printed circuit techniques which permit such resolution.* (*for example of 4 cm diameter for ½° resolution)

Figure 3:
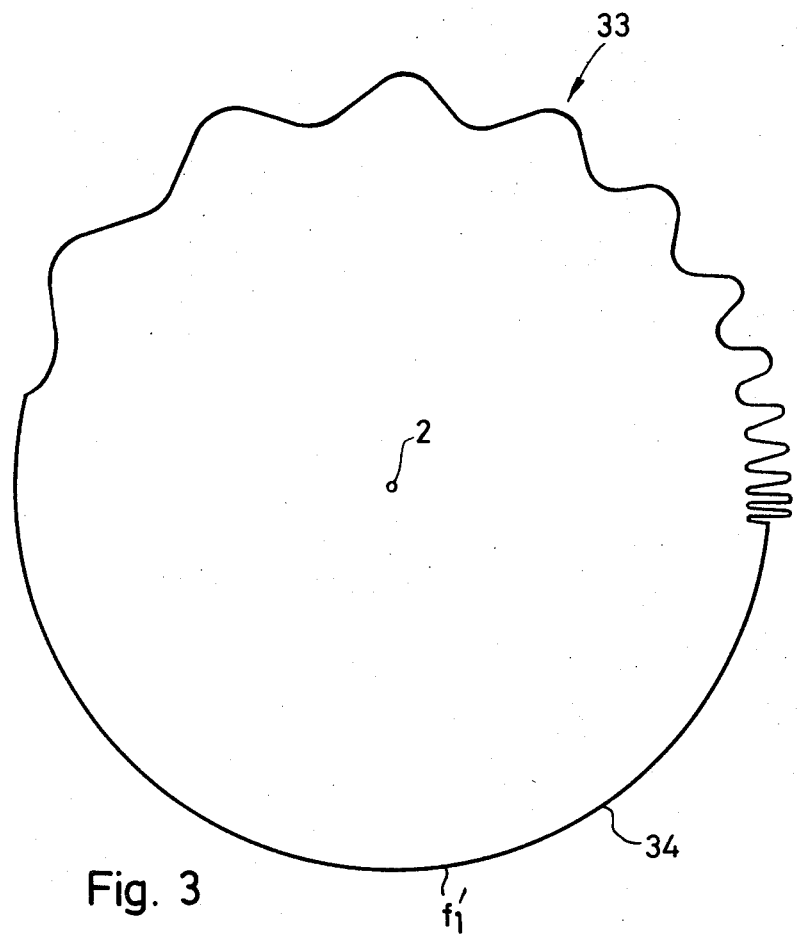
FIG. 3 is a schematic representation of a short circuit winding having a configuration representative of a curve of continuously varying frequency.

The configuration of the form function of the conductors, or windings on rotor and stator need not be a periodic function. FIG. 3 illustrates an aperiodic function $f1$, which is drawn to illustrate a function having a linear rate of change of frequency (with respect to distance from a datum). The rotor, short circuited winding 33, having a circumferential short circuiting loop 34 is faced by a stator winding of identical outline. Upon each full revolution of the rotor, the stator will provide upon exact congruence a short pulse, thus decoding the correlation function between rotor and stator.

Figure 4:
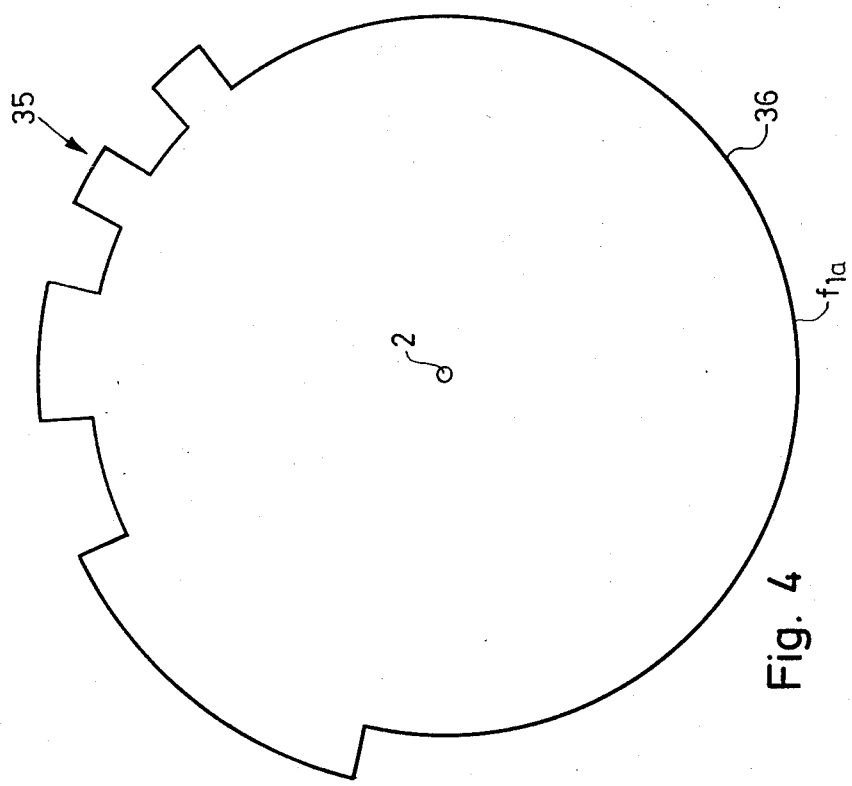
FIG. 4 is a plan view of a winding configuration utilizing square wave pulse sequences in pseudo-stochastic arrangement.

FIG. 4 illustrates a short circuit winding 35 for the rotor having a circumferential path 36 with a pseudostochastic square wave pulse sequence as form function $f1a$. This arrangement can be calculated mathematically, and then transferred to the circular carrier for the rotor, or stator, respectively, by means of a plotter. FIG. 4 illustrates, as a simple example, a 13-step Barker code. Other sequences, well known in the correlation technology may be used, for example codes representative of 1024 number codes corresponding to a 10-bit register, and which yield excellent sharply defined correlation pulses. The output system, that is the system on the stator, would have an identical form function as that of the rotor, that is, will have also a function $f1a$. Upon each full revolution of the rotor, the output system will provide a clearly defined sharp pulse with steep flanks, upon exact congruence of the function $f1a$ on the rotor and the similar function on the stator. The shape of the pulse, with respect to time, will be triangular, with a base width which is twice the length of one step of the code represented by the configuration of the windings, that is, the function $f1$. The configuration of FIG. 3 has the advantage with respect to that of FIG. 1 that, if only one pulse is desired for each revolution, a single and sharply defined output pulse is obtained from the system of FIG. 3. Correlation theory teaches that, if the function of the configuration, that is, its functional shape, is purely statistical, the output will be the ideal Dirac pulse. Purely statistical functions are not suitable in the manufacture of such transducers, however, since they are difficult to be defined in advance and even more difficult to be actually constructed. A pseudo-stochastic function, in accordance with FIG. 4, is quite suitable, however, and can be easily manufactured with known technology. Currently available printed circuit manufacturing techniques, particularly automatic apparatus permit construction of windings, and design of conductor paths which are very close together so that each individual step of the undulations can be selected so that it is very close to the next one. A code can thus be selected which permits excellent resolution of angular displacement.

Figure 5:
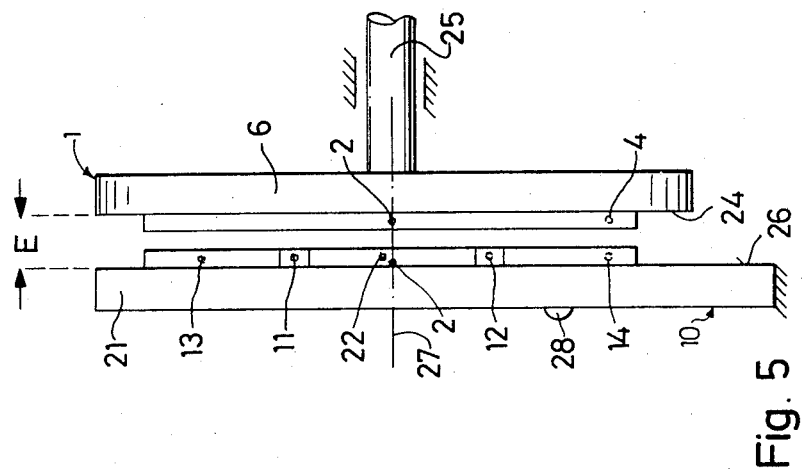
FIG. 5 is a side view of a pancake-type transducer.

FIG. 5 illustrates the details of a construction, in schematic and somewhat distorted transverse view. The shortcircuited windings 3 and 4 are applied to carrier 6 of the rotor 1, one conductor of winding 4 being illustrated in cross section. It is applied to the facing surface 24 of the carrier 6. Shaft 25 is connected to the element, the rotary position, or rotation of which is to be detected. The output system on stator 10 shows output winding conductors 11, 12, 13 and 14, located on the surface 26 of base or carrier plate 21, which faces surface 24 of carrier 6. The energizing winding 22 is likewise located on surface 26. The windings are shown exaggerated in their thickness with respect to the remaining structural components. The two carriers 6 and 21 are spaced from each other by a distance E, the two centers of the systems being located on the axial line 27 of shaft 25.

The short-circuited winding on the rotor 1, the conductors of the output windings, and the energizing winding are preferably manufactured in accordance with printed circuit technology. The carrier plates for the printed circuit can be the support 7 and 21, and the connecting lines 28 of the output system can be contact points formed on the reverse side of the support plate 21, as shown in FIG. 5.

The apparatus of the present invention provides a transducer system which is contact-less, and operates with low, or no counter torque, and is free from friction independent of bearing losses. The apparatus is practically foolproof, sturdy, and reliable, and provides high angular resolution and high angular accuracy, with little structural requirements. The entire actively operating system of the transducer can be manufactured as printed circuits, in substantial quantities, with the printed circuits being matched to specific operating requirements. The system can be built small and compact. It may be used in many different fields of technology, particularly in control and measuring technology, and which require exactly reproducible pulses depending on rotational displacement, or rotational movement. Fields of application are, for example, triggering at predetermined times, or positions, in registering and recording systems; triggering of ignition or other pulses in control of engines, typically internal combustion engines and the like. The apparatus is entirely suitable for rough operating conditions and variable surroundings under changing ambient conditions, and the transducer can readily be constructed to be essentially impervious to shock, dirt, or contaminated environments. In such instances, and when excessive freedom from friction is not necessary, shaft 25 can be carried out into the support plate 21 of the stator, to be located in another bearing therein.

Various changes and modifications may be made within the inventive concept.

The invention has been described specifically with reference to an apparatus in which the energizing winding and output winding are on the stator, and the short-circuited winding is on the rotor. The relationship of the windings can be changed, however, as desired. For example, if the rotating parts are self-contained and an output is desired to be taken directly from the rotor itself, the pulses may then be conducted from the rotor to a utilization device which is rotating with the rotor shaft.

The invention has been described further specifically in connection with a pancake-type construction, similar to a pancake-type dynamo electric machine. Other constructions are possible and cylindrical rotors and stators may likewise be used, provided that the features of inducing current in a short circuit winding on one of the system elements, from another element (and relatively rotatable thereto), and readout of the short circuit current by a winding having an arrangement which bears a mathematical relationship to the winding on the opposite element, is observed.

I claim:

1. Non-contacting rotary position-rotation electrical signal transducer comprising
    a rotor (1) and a stator (10), the position and rotation of the rotor with respect to the stator being detectable by output signals derived from the stator;
    an energizing winding (22) located on the stator;
    an output winding (11, 12, 13, 14) located on the stator;
    and a short circuited rotor winding (3, 4; 33, 34; 35, 36) located on the rotor;
    wherein the output winding on the stator and the short-circuited winding on the rotor have radially undulating or crenelating or crenelated appearance and configuration ($f1, f2$) and said windings are located on the stator, and rotor, respectively, in inductively coupled position;
    and wherein the energizing winding has an appearance or configuration which has a smooth outline and located on the stator to be inductively coupled with the short circuited winding on the rotor, to provide, upon energization of the energizing winding with an a-c signal, output signals from said output windings on the stator due to transfer of power from the energizing winding on the stator to the short circuited winding on the rotor and power transfer to the output winding on the stator, upon match of at least some of the undulations, or crenelations, of the short-circuited winding on the rotor with the output winding on the stator.

2. Transducer according to claim 1, wherein the configuration of the short-circuited winding and the output winding are shaped to provide signals adapted for decoding by correlation analysis.

3. Transducer according to claim 1, wherein the short circuited winding and the output winding each comprise concentric winding sections (3, 4, 34, 36; 11, 12, 13, 14) of different undulating characteristics in different radially positioned sections, and wherein matching sections of the short circuited winding and the output windings are essentially similar at least for a predetermined circumferential portion.

4. Transducer according to claim 1, further comprising a galvanic connection between the energizing winding and the output winding.

5. Transducer according to claim 4, further comprising rectifier means (G) connected to the output windings and differential amplifiers (29, 30, 31, 32) connected to the rectifier means.

6. Transducer according to claim 5, further comprising decoding means (301) connected to the differential amplifier.

7. Transducer according to claim 1, wherein the rotor and stator elements are opposed, flat disks (6, 21), the rotor (1, 6) being rotatable about a central axis (2) transverse to the plane of the disk.

8. Transducer according to claim 7, wherein the energizing winding is formed as a loop, concentric with the axis (2).

9. Transducer according to claim 7, wherein the energizing winding comprises a flat spiral winding surrounding the central axis;
    and the power supply means comprises an oscillator, the spiral winding forming the tank coil for the oscillator.

10. Transducer according to claim 7, wherein the short circuited and the output windings are essentially congruent and have a repetition sequence of undulations defined by $2\pi/a$, wherein $a$ is a whole number of the set of $a = 1, 2, 3 \ldots n;$ and at least one of the windings is sub-divided into circumferentially separate sections, one of the windings sections being offset to the other winding section by a circumferential distance of $\pi/2a$.

11. Transducer according to claim 7, wherein the shortcircuited and the output windings are essentially congruent and have a repetition frequency of undulation defined by $2\pi/a$, wherein $a$ is a whole number of the set of $a = 1, 2, 3 \ldots n;$ and wherein the windings are sub-divided into at least two winding sub-sections which are concentrically located, and wherein the number $a$ of the winding of one subsection differs from the number a of the subsection of the other winding.

12. Transducer according to claim 11, wherein the number a of the outermost winding subsection is 360 $k$, wherein $k$ is a whole number of at least one.

13. Transducer according to claim 1, wherein the configuration of the short-circuited winding and the output winding are essentially congruent and shaped to provide signals adapted for decoding by auto-correlation techniques.

14. Transducer according to claim 13, wherein said windings are crenelated to provide output signal sequences having the relationship $2\pi/a$, wherein $a$ is a whole number of the set of $1, 2, 3 \ldots n$.

15. Transducer according to claim 13, wherein the configuration is in accordance with a pseudo-stochastic square wave pulse oscillation of base period $2\pi/a$, wherein $a$ is a whole number of the set of $1, 2, 3 \ldots n$.

16. In a non-contacting rotary position-electrical signal transducer system having a disk rotor and a disk stator, the rotor being rotatable about an axis of rotation, the position and rotation of rotor and stator with respect to each other being detectable by output signals derived from the stator;

an energizing winding (22) forming a flat loop of smooth outline, concentric with the axis of rotation located on the stator (10);

means (23) supplying a-c power to said energizing winding;

a flat, short-circuited winding (3, 4; 33, 34; 35, 36) located on the rotor (1) concentric with the axis of rotation and inductively coupled to the energizing winding loop (22) on the stator (10) so that current will be induced in the short-circuited winding on the rotor from said energizing winding on the stator;

a flat output winding (11, 12, 13, 14) located on the stator (10) concentric with the axis of rotation and inductively coupled to the short-circuited rotor winding (3, 4; 33, 34; 35, 36), the short-circuited rotor winding and the output stator winding having similar, essentially congruent winding configuration $(f1, f2)$ of radially undulating or crenelated appearance and providing output signals determined by the respective position of the rotor (1) and the stator (10) on which the short-circuited winding and the output winding, respectively, are located, and permitting correlation of currents flowing in the output winding with respect to the short-circuit current flowing in the short-circuited winding;

and means (29, 30, 31, 32) connected to said output windings sensing the output current derived from said winding, said output current being representative of the relative position of said rotor (1) and said stator (10).

17. System according to claim 16, wherein the a-c power supply is an oscillator (23) and the energizing winding loop (22) forms the tank coil for the oscillator.

18. System according to claim 16, wherein the shape of the undulations or crenelations of the short-circuited winding (33, 34; 35, 36) on the rotor (1) and hence of the output winding (11, 12, 13, 14) on the stator (10) is defined by an aperiodic function $(f'1; f1a)$ having a linear rate of change of width, or repetition, per unit of arc angle, of undulations or crenelations.

19. System according to claim 16, wherein the shape of the undulations or crenelations comprises a symmetrical wave (33, 35) of increasing frequency and essentially constant amplitude extending in a circular ring, with the axis of rotation as the center up to about one half of the circumference of the ring, the remaining circumference of the ring (34, 36) being a circular segment with said axis of rotation as the center and located at about the null or center line of said wave.

* * * * *